(12) United States Patent
Tschaeschke

(10) Patent No.: US 6,332,628 B1
(45) Date of Patent: Dec. 25, 2001

(54) SIDE-IMPACT AIRBAG ASSEMBLY

(75) Inventor: Ulrich Tschaeschke, Ehningen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/400,873

(22) Filed: Sep. 22, 1999

(30) Foreign Application Priority Data

Sep. 22, 1998 (DE) ............................. 198 43 402

(51) Int. Cl.⁷ .......................... B60R 21/22; B60R 21/16
(52) U.S. Cl. ..................... 280/730.2; 280/728.2
(58) Field of Search ................... 280/730.2, 730.1, 280/728.2, 743.1

(56) References Cited

U.S. PATENT DOCUMENTS

| | | | |
|---|---|---|---|
| 5,265,903 | * 11/1993 | Kuretake et al. | 280/730 |
| 5,791,683 | * 8/1998 | Shibata et al. | 280/730.2 |
| 5,957,487 | * 9/1998 | Stutz | 280/730.2 |
| 6,070,903 | * 6/2000 | Beisswenger et al. | 280/736 |
| 6,073,961 | * 6/2000 | Bailey et al. | 280/730.2 |
| 6,082,761 | * 7/2000 | Kato et al. | 280/730.2 |
| 6,102,435 | * 8/2000 | Wallner et al. | 280/730.2 |
| 6,155,594 | * 12/2000 | Ibe et al. | 280/728.2 |
| 6,170,861 | * 1/2001 | Tietze | 280/730.2 |
| 6,173,989 | * 1/2001 | Stutz | 280/730.2 |
| 6,173,990 | * 1/2001 | Nakajima et al. | 280/730.2 |
| 6,176,513 | * 1/2001 | Neidert | 280/730.2 |
| 6,234,516 | * 5/2001 | Boxey | 280/730.2 |

FOREIGN PATENT DOCUMENTS

| | | |
|---|---|---|
| 29605896U1 | 7/1996 | (DE) . |
| 29616904U1 | 3/1997 | (DE) . |
| 298 03 985U1 | 8/1998 | (DE) . |

* cited by examiner

*Primary Examiner*—Brian L. Johnson
*Assistant Examiner*—Joselynn Sliteris
(74) *Attorney, Agent, or Firm*—Crowell & Moring LLP

(57) ABSTRACT

A side-impact airbag device for a passenger cell of a motor vehicle includes a window bag which, in the active, inflated state, has a window portion which at least partially covers a side window and extends between roof support pillars. At least one of the window portions of the window bag is assigned an additional window bag pillar portion which, in the active, inflated state, at least partially covers the associated pillar relative to the passenger cell and provides a cushion against the impact, in particular, of the head and shoulder area of a passenger. In the folded-up, uninflated fitted state, the window portion of the window bag lying stowed under a lateral end portion, is bounded at the front and rear by a windscreen and a rear window respectively, of the interior lining headliner which is mounted on the roof frame and the lateral end portion of which is moved when the window bag is triggered to free the deployment path. In the folded-up fitted state, the front and/or rear window bag pillar portion lie/lies stowed under the lateral end portion of the interior lining headliner and can emerge therefrom in the direction of the A or C pillar.

21 Claims, 2 Drawing Sheets

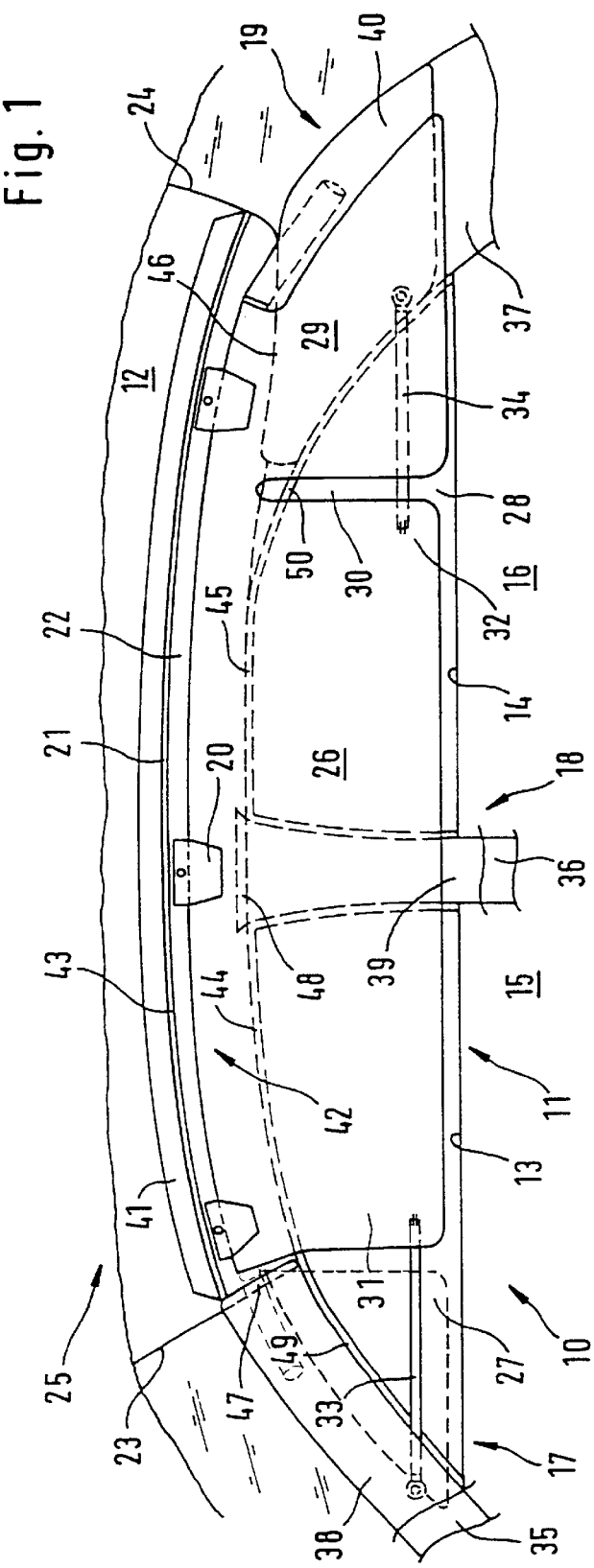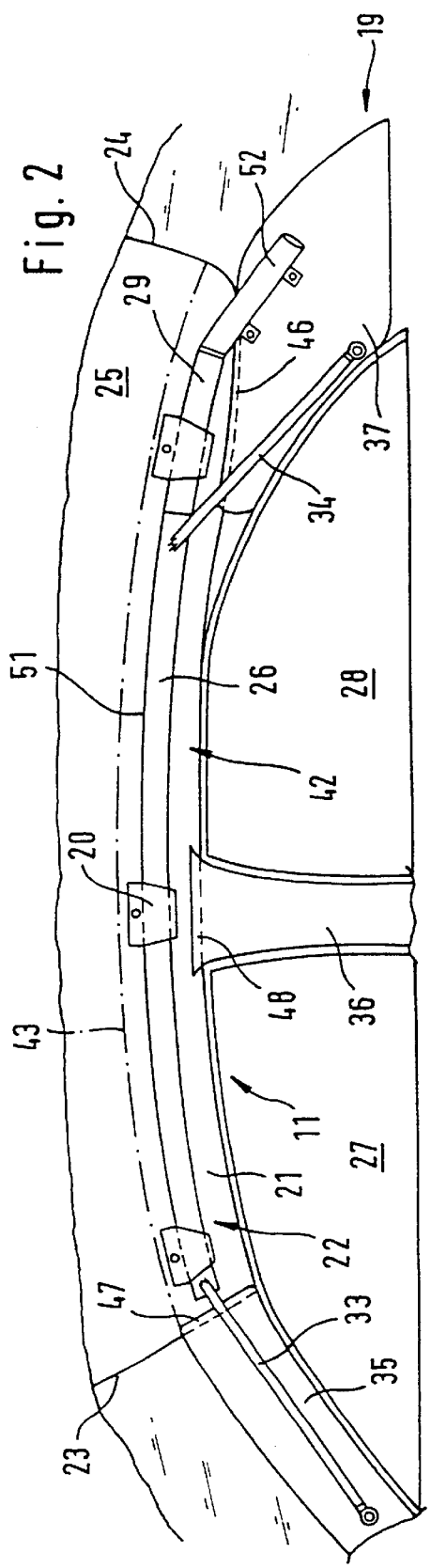

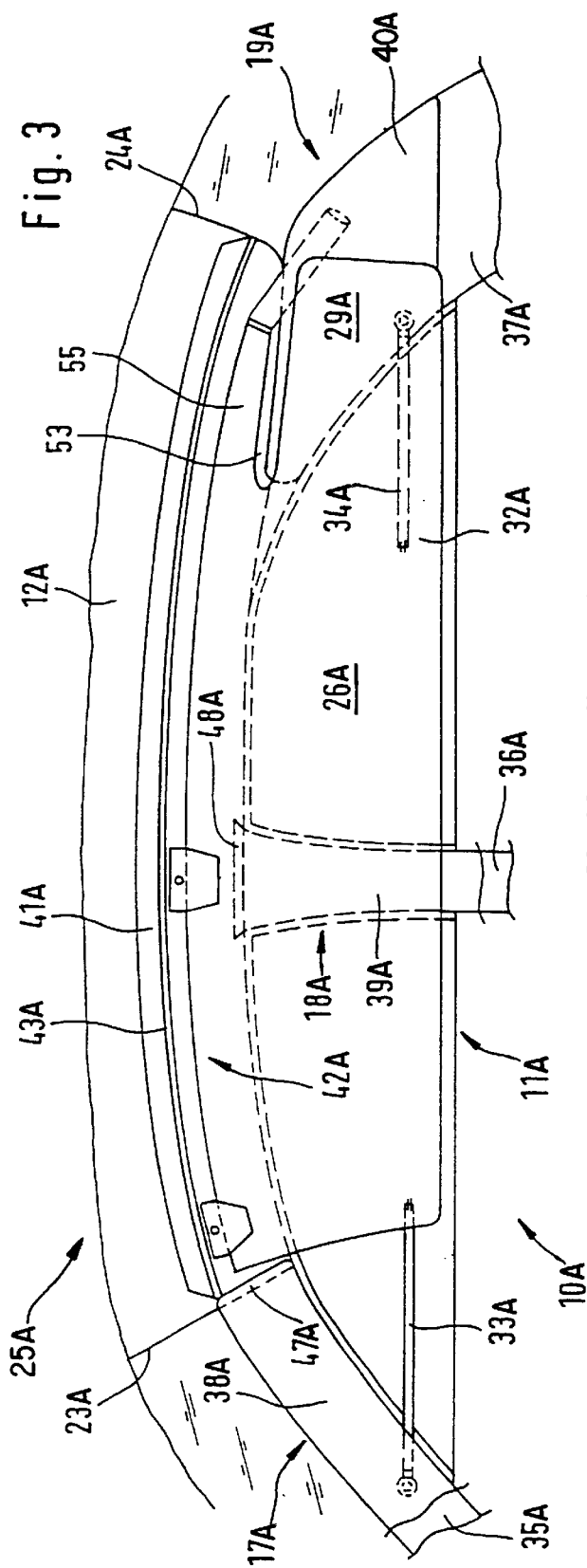
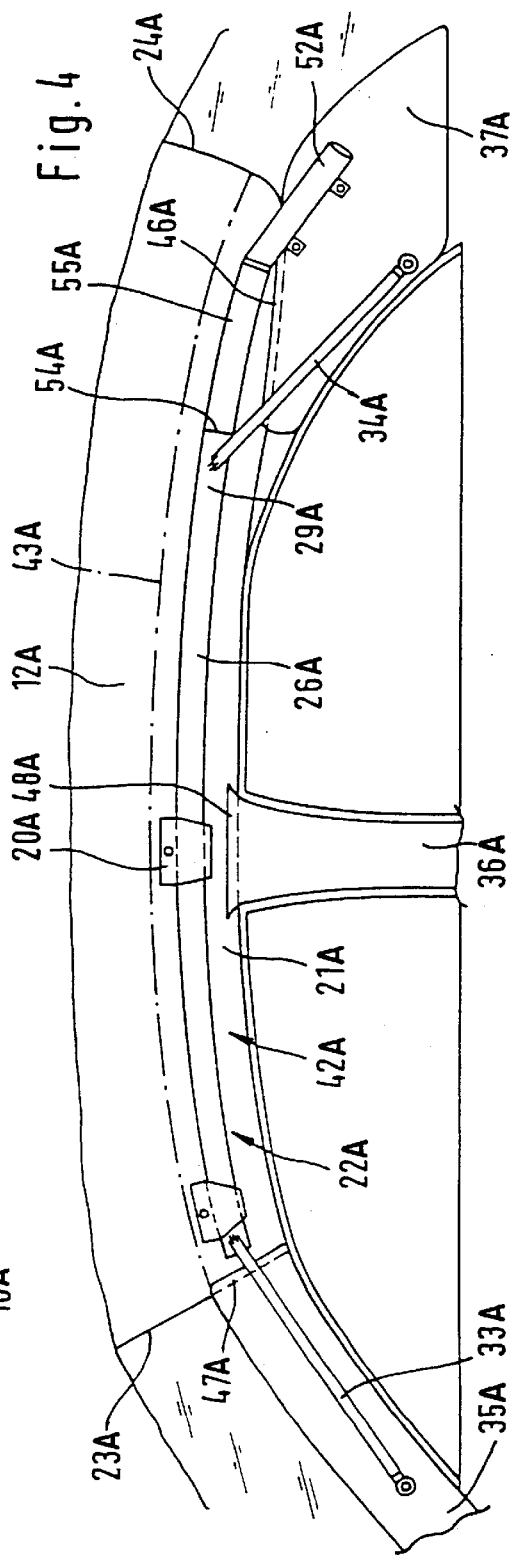

SIDE-IMPACT AIRBAG ASSEMBLY

BACKGROUND AND SUMMARY OF THE INVENTION

This application claims the priority of German application 198 43 402.2, filed in Germany on Sep. 22, 1998, the disclosure of which is expressly incorporated by reference herein.

The invention relates to a side-impact airbag device which covers a vehicle side window and parts of respective A and B or B and C pillars.

A side-impact airbag device of this kind, which is known from German Patent Document DE 298 03 985 U1, comprises a window bag with a window portion which, in the active, inflated state, at least partially covers a side window and extends from an A pillar to a C pillar. The window bag furthermore comprises a window bag pillar portion which is assigned to the window portion and, in the active, inflated state, at least partially covers the associated C pillar in relation to the passenger cell. In the folded-up, uninflated fitted state, the window portion and the window bag pillar portion lie stowed under a lateral end portion bounded by a windscreen and a rear window of the interior lining which is mounted on the roof frame, respectively, the end portion being moved to free the deployment path when the window bag is triggered.

Since, in the folded-up fitted state, the window portion and the window bag pillar portion are arranged under the lateral end portion bounded at the front and rear by a windscreen and a rear window respectively, it may only be possible to cover a limited part of the C pillar with this known window bag or its window bag pillar portion. Particularly in the case of very sharply raked C pillars, as customary, for example, on coupe vehicles, the headliner ends very far forwards relative to the C pillar and, as a result, it can be problematic to cover the latter over a wide area with the window bag pillar portion.

Another side-impact airbag device is known from German Patent Document DE 296 16 904 U1 and comprises a window bag which, in the active, inflated state at least partially covers a side window and extends from the A pillar at least as far as the B pillar of the vehicle. In another embodiment of this window bag, it is furthermore envisaged that the said window bag should extend from the A pillar to the C pillar. The window bag is assigned a front portion which, in its active, inflated state, covers the A pillar, at least to a large extent, and, in the event of an offset frontal impact or an oblique impact from the front, prevents the head from coming into contact with the A pillar. In this arrangement, the window bag can be either in one piece with the front portion or be formed by separate chambers. In the region of its front and rear bottom ends, the window bag comprising the front portion is connected by a respective strap to the A pillar and the C pillar, and these straps hold the window bag in position in its active, inflated state. In the uninflated fitted state, the window bag is concealed under the lining of the A and the C pillar and the lateral roof member.

Arranging the window bag in the area under the lining of the A and C pillars in the uninflated fitted state has the disadvantage that recesses must be provided in the basic structure of the A and C pillars, these running, for example, centrally in relation to the respective columns, in the direction of extension of the latter, and thereby weakening the basic structure of the pillars in a disadvantageous manner. In addition, the A and/or C pillar lining must be of two-piece design and this results in additional outlay in terms of production and costs.

German Patent Document DE 296 05 896 U1 describes a side-impact airbag device with a window bag which, in the active, inflated state, extends from an area to the side of the front occupant into an area to the side of a rear occupant. In the folded fitted state, the window bag extends under the interior lining of the vehicle, along the A pillar, the roof frame and the C pillar.

Thus this protective device also has the disadvantages already described, namely that recesses which weaken the basic pillar structure have to be provided in the A or C pillar, and the A or C pillar lining has furthermore to be of two-piece design.

It is an object of the invention to create a side-impact airbag device for a passenger cell of a motor vehicle of the type referred to above which offers reliable protection for the vehicle occupants, avoids weakening the basic structure of the A or C pillars and, at the same time, allows for more simple and economical installation in the vehicle.

According to preferred embodiments of the invention, this object is achieved by a side-impact airbag device for a passenger cell of a motor vehicle comprising a window bag with, in the active, inflated state, a window portion which at least partially covers a side window and extends from a B pillar at least as far as a C pillar and/or extends from the B pillar at least as far as an A pillar, and with at least one window bag pillar portion which is assigned to the window portion and in the active, inflated state, at least partially covers the associated A and/or C pillar in relation to the passenger cell, in the folded-up, uninflated fitted state, the window portion and the front and/or rear window bag pillar portion lies stowed under a lateral end portion, bounded at the front and rear by a windscreen and a rear window respectively of the interior lining (headliner), which is mounted on the roof frame, and the lateral end portion is moved when the window bag is triggered to free the deployment path, wherein the front and/or rear window bag pillar portion emerges in a vertical and horizontal movement, obliquely forwards and downwards and rearwards and downwards respectively in the direction of the A and C pillar respectively as it unfolds.

In the case of the side-impact airbag device according to the invention, the front and/or rear window bag pillar portion emerges in a vertical and horizontal movement obliquely forwards and downwards and rearwards and downwards in the direction of the A and C pillar respectively as it unfolds. Compared with the known prior art, in which the window bag pillar portion emerges essentially only in a vertical downward movement, this provides cover for the A and/or C pillar over a wider area. This is particularly desirable in the case of coupe vehicles with very sharply raked pillars. This also allows very wide A or C pillars to be covered in a particularly effective manner. The window bag pillar portions are stowed in the region of the headliner, on a roof member or the like, thereby making it possible to avoid weakening the basic structure of the A or C pillar. To free the deployment path, the lateral end portion is moved, pillar linings of the A, B and C pillars remaining firmly in place as the window bag is unfolded and inflated, and it being possible to manufacture and install with a correspondingly lower outlay on construction.

Advantageous embodiments of the side-impact airbag device according to the invention, together with expedient developments of the invention, are described herein and in the claims.

Thus it is advantageous, as a development of preferred embodiments of the invention, if, in the active state, the window bag has a vertical dividing portion which divides the front and/or rear window bag pillar portion at least partially from the window portion. As they unfold, the window portion executes a vertical movement in a downward direction and the window bag pillar portion executes a movement in an obliquely downward direction, as a result of which both portions reach their point of use along the shortest path.

A window bag pillar portion divided from the window portion by a vertical dividing portion in particular is distinguished by a particularly short unfolding time.

It has also proven advantageous according to certain preferred embodiments to have the entire window bag with the window portion and the window bag pillar portion or portions emerge between the headliner and a sealing strip arranged on a lateral roof member when it is triggered, it being possible for the window bag simply to be arranged on the roof shell as a unit integrated into the sealing strip.

A short deployment path is also obtained according to certain preferred embodiments if, when triggered, the front and/or rear window bag pillar portion emerges between the headliner in the region of the A and/or C pillar and the associated A or C pillar lining and the window bag pillar portion is hence arranged directly above its point of use.

If, as a further development of certain preferred embodiments of the invention, the front and/or rear window bag pillar portion is/are at least partially divided from the window portion by a horizontal dividing portion, it is possible to cover the A or C pillar over a particularly long distance towards the front and/or rear as seen in the longitudinal direction of the vehicle.

If, according to certain preferred embodiments, the horizontal dividing portion is directly below a filler duct of the window bag in the active state of the front and/or rear window bag pillar portion, so that the window bag pillar portion obtained can be moved particularly well horizontally and, in addition, is capable of covering the A or C pillar over almost their entire height.

If the front and/or rear window bag pillar portion are folded up towards the window portion in the fitted state, according to certain preferred embodiments, it is possible to reduce the fitted length of the deployable window bag considerably. The window bag pillar portions can thus be arranged in the region of the lateral end portion of the headliner even on vehicles with sharply raked A and C pillars, the window bag pillar portions being moved vertically downwards and horizontally forwards or rearwards as they are unfolded.

An exit flap is provided on the lateral end portion of the headliner according to certain preferred embodiments, this being a simple way of enabling the lateral end portion to be pivoted inwards and upwards and hence of freeing the deployment path. If the pivot is situated in the region of the grab handles arranged on the headliner, these can be used to limit the pivoting motion of the exit flap.

If a front and rear end of the window portion are connected to a basic A, B or C pillar structure by a respective strap according to certain preferred embodiments, the window bag is held at its point of use in the active, inflated state. As the window bag unfolds, the straps emerge between the corresponding A, B or C pillar lining and the basic structure of the A, B or C pillars, allowing the pillar linings to be left where they are. To ensure rapid unfolding and movement to the point of use, the front and/or rear window bag pillar portion is/are not connected to the straps.

If the straps are arranged approximately at the height of the window ledges according to certain preferred embodiments, the tensioning line in the window bag can be kept correspondingly low, thereby reliably protecting even people who are sitting low down from striking the windows or pillars.

In order to create a particularly simple and space-saving construction of the side-impact airbag device, the window bag pillar portions and the window portion are connected to a common gas generator by a common filler duct according to certain preferred embodiments.

To enable particularly rapid inflation and unfolding of the side-impact airbag device, the front and/or rear window bag pillar portion and the window portion are each assigned separate filler ducts which are connected to a common gas generator or to respective gas generators according to certain preferred embodiments.

Finally, it has proven to be particularly preferential to design the A and/or C pillar lining in one piece and thus reduce the outlay in terms of production and installation according to certain preferred embodiments.

Other objects, advantages and novel features of the present invention will become apparent from the following detailed description of the invention when considered in conjunction with the accompanying drawings.

BRIEF DESCRIPTION OF THE DRAWINGS

FIG. 1 shows a side view of a side-impact airbag device in accordance with a first embodiment of the invention, with a window bag which is attached to a vehicle bodyshell structure and is shown in the active, inflated state;

FIG. 2 shows a side view of the side-impact airbag device according to FIG. 1 with the window bag in the fitted uninflated state;

FIG. 3 shows a side view of a side-impact airbag device according to another embodiment of the invention, with a window bag which is attached to a vehicle bodyshell structure and is shown in the active, inflated state; and FIG. 4 shows a side view of a side-impact airbag device according to FIG. 3 with the window bag in the uninflated fitted state.

DETAILED DESCRIPTION OF THE DRAWINGS

FIG. 1 is a side view of a side-impact airbag device 10 for a passenger cell with a window bag 11 which, in the active, inflated state, extends vertically approximately from a headliner 12 to the level of window ledges 13, 14 of the front and rear doors 15, 16 and horizontally from the A pillar 17, via the B pillar 18 as far as the C pillar 19. The headliner 12 comprises a plastic component which is covered with fabric or leather on the passenger cell side, is matched to a roof shell 21 of the vehicle and can be attached to the latter by snap-in connecting elements, for example. The window bag 11 is attached with the aid of holders 20 to a lateral roof member 22 which is associated with the roof shell 21 and extends from a front end 23, bounded by a windscreen, to a rear end 24, bounded by a rear window, of the roof 25 and the headliner 12.

The window bag 11 comprises a window portion 26 which at least partially covers the B pillar 18 and the front and rear side windows 27, 28, thus reliably protecting a vehicle occupant from a dangerous collision with one of the windows 27, 28 or the B pillar 18 or preventing his or her head from moving out of the passenger cell through a damaged side window 27, 28 in the event of a side impact.

In the area of the C pillar 19, the window bag 11 comprises a rear window bag pillar portion 29 which is associated with the window portion 26 and cushions the head and shoulder region, in particular, of a passenger from a collision with the C pillar 19. In the embodiment example shown here, the window bag 11 has a vertical dividing portion 30 which is designed as a gap in the active state and divides the window portion 26 at least partially from the rear window bag pillar portion 29. Like the window portion 26, the rear window bag pillar portion 29 is designed as a gas cushion but could also comprise a non-inflatable cushioning material such as foam according to other contemplated embodiments.

At its front and rear ends 31, 32, the window portion 26 is connected by a respective strap 33, 34 to the basic structure of the A pillar 35 and the basic structure of the C pillar 37, and the window bag 11 is thus held in position in the active state. In this arrangement, the straps 33, 34 extend approximately horizontally and preferably at approximately the level of the window ledges 13, 14. The rear window bag pillar portion 29 is not connected to the rear strap 34 and is arranged ahead of the latter when looking from the passenger cell outwards.

As the window bag 11 is unfolded, the A, B and C pillar linings 38–40 remain firmly in position and an exit flap 41, which is associated with a lateral end portion 42 of the headliner 12 and extends in the longitudinal direction of the vehicle approximately between the front and rear ends 23, 24 of the roof 25, pivots inwards and upwards about a pivot 43, clearing the way for the window bag 11 to be deployed. In the embodiment shown here, the exit flap 41 pivots out of a respective area of overlap 44, 45 with a door seal 49, 50 of the front and rear doors 15, 16 in the door region and out of areas of overlap 46–48 with an A, B and C pillar lining 38–40 in the region of the pillars. The front strap 33 emerges between the door seal 49 of the front door 15 and the A pillar lining 38, and the rear strap 34 emerges between the door seal 50 of the rear door 16 and the C pillar lining 40.

FIG. 2 is a side view of the window bag 11 in the fitted state, the interior lining of the passenger cell together with the A, B and C pillar linings 38–40 and the lateral end portion 42 of the headliner 12 with the pivotable exit flap 41 not being shown. Only the pivot 43 is indicated in FIG. 2. The window bag 11 is secured on the roof member 22 with the aid of a sealing strip 51 or similar clamping device which surrounds the window bag 11 in the folded-up fitted state. It can be seen here that the entire window bag 11 is arranged under the lateral end portion 42 of the headliner 12 between the front and rear ends 23, 24 of the roof 25. Viewed in the longitudinal direction of the vehicle, the vertical dividing portion 30 which divides the window portion 26 at least partially from the window bag pillar portion 29 is approximately at the level of the front end of the C pillar 19, with the result that, when the window bag 11 is triggered, the rear window bag pillar portion 29 emerges downwards essentially between the lateral end portion 42 or exit flap 41 of the headliner 12 and the C pillar lining 40. The rear window bag pillar portion 29 and the window portion 26 of the window bag 11 are connected to a filler duct, not shown, by means of which a gas can flow out of a common gas generator 52 both into the rear window bag pillar portion 29 and into the window portion 26 when the window bag is triggered. The window portion 26 and the window bag pillar portion 29 can be divided into a plurality of chambers, each connected to the filler duct.

In FIGS. 3 and 4, similar reference numbers as in FIGS. 1 and 2, with a suffix "A" are used to indicate similar features. Unless otherwise indicated, the description of similarly numbered features in FIGS. 1 and 2 apply.

FIG. 3 is a side view of another embodiment of a side-impact airbag device 10A with a window bag 11A in an active, inflated state, the said window bag 11A differing from the window bag 11 in accordance with the first embodiment in that the rear window bag pillar portion 29A, which is designed as a gas cushion, is at least partially divided from the window bag 11A by a gap-shaped dividing portion 53 which is horizontal in the active state. The horizontal dividing portion 53 is situated directly below a filler duct 55 and extends horizontally and, when viewed in the longitudinal direction of the vehicle, starting approximately from the level of the front end of the C pillar 19A to the end of the rear window bag pillar portion 29A and of the window bag 11A. The rear strap 34A is once again attached at one end to the rear end 32A of the window portion 26A and, at the other end to the C basic pillar structure 37A, the window bag pillar portion 29A not being attached to the rear strap 34A and being arranged in front of the latter when viewed from the passenger cell looking outwards.

In FIG. 4, the window bag 11A according to FIG. 3 is shown in the fitted state, the interior lining of the passenger cell with the A, B and C pillar lining 38A–40A and the lateral end portion 42A of the headliner 12A with the pivotable exit flap 41A once again not being shown. Only the pivot 43A is indicated in FIG. 4. Here too, the fitted length of the window bag 11A is bounded by the front and rear ends 23A, 24A of the roof 25A and is arranged under the lateral end portion 42A (not shown here) of the headliner 12A.

In the fitted, uninflated state, the window bag pillar portion 29A is folded up forwards in the direction of the window portion 26A over the entire length of the horizontal dividing portion 53, as indicated by the line 54 on the window bag 11A. When the window bag 11A is unfolded, the window portion 26A moves downwards in an essentially vertical direction. The rear window bag pillar portion 29A unfolds downwards in a vertical movement and rearwards in a horizontal movement to protect the passenger from colliding with the C pillar 19A.

It should also be regarded as within the scope of the invention to provide a front window bag pillar portion to cover the A pillar 17A, in which case this window bag pillar portion would also be arranged under the lateral end portion 42A of the headliner 12A when folded up and, when unfolded, would be capable either only of downward movement in a vertical direction or downward and forward movement in a vertical and horizontal direction.

The invention also encompasses the provision of separate gas generators for deploying the window portion and the window bag pillar portion or portions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Side-impact airbag assembly for a passenger cell of a motor vehicle, comprising:
    a window bag with, in the active, inflated state, a window portion which at least partially covers a side window and extends from a B pillar at least as far as a C pillar or extends from the B pillar at least as far as an A pillar, and with at least one window bag pillar portion which is assigned to the window portion and in the active, inflated state, at least partially covers the associated A or C pillar in relation to the passenger cell, in the folded-up, uninflated fitted state, the window portion and window bag pillar portion lie stowed under a lateral end portion, bounded at the front and rear by a windscreen and a rear window, of an interior lining, which is mounted on a roof frame, and the lateral end portion is moved when the window bag is triggered to free a deployment path, wherein the window bag pillar portion emerges in a vertical and horizontal movement, obliquely forwards and downwards or rearwards and downwards in the direction of the A or C pillar, respectively, as the window bag pillar portion unfolds.

2. Side-impact airbag assembly according to claim 1, wherein in the active state the window bag has a dividing portion which divides the window bag pillar portion at least partially from the window portion.

3. Side-impact airbag assembly according to claim 2, wherein the dividing portion extends vertically in the active state of the window bag.

4. Side-impact airbag assembly according to claim 2, wherein the window portion emerges when triggered between a headliner of the interior lining and a sealing strip arranged along a roof member.

5. Side-impact airbag assembly according to claim 2, wherein the window bag pillar portion emerges when triggered between a headliner of the interior lining in the region of the A or C pillar and the associated A or C pillar lining.

6. Side-impact airbag assembly according to claim 1, wherein an exit flap which can be pivoted about a pivot to free the deployment path is provided on the lateral end portion of a headliner of the interior lining.

7. Side-impact airbag assembly according to claim 1, wherein a front and rear end of the window portion are respectively connected to a basic structure of the A or C pillars by a strap which emerges between the corresponding A or C pillar lining and the basic structure of the A or C pillars when the window bag is unfolded.

8. Side-impact airbag assembly according to claim 1, wherein in the active, inflated state, the straps extend horizontally approximately at a level of window ledges.

9. Side-impact airbag assembly according to claim 1, wherein the window bag pillar portion and the window portion are connected to a common filler duct through which, when triggered, a gas flows into the window bag from a common gas generator.

10. Side-impact airbag assembly according to claim 1, wherein the window bag pillar portion and the window portion are each assigned separate filler ducts through which, when triggered, a gas flows into the corresponding portion of the window bag from a common or respective gas generator.

11. Side-impact airbag assembly according to claim 1, wherein the A or C pillar lining is of one-piece design.

12. Side impact airbag assembly for a passenger cell of a motor vehicle which has a plurality of pillars, a side window disposed between first and second ones of said pillars, and a roof frame extending above the side window, said side impact airbag assembly comprising:

a window bag with a window portion and a pillar portion, a window bag housing at the roof frame, and a collision responsive window bag inflator operable to inflate the window bag and thereby deploy the bag from a folded up position in the window bag housing to an inflated passenger protecting position, wherein the window bag and window bag housing are configured to deploy the window bag in a downward and obliquely horizontal direction with the window portion covering at least a part of the side window and the pillar portion covering at least a part of the first pillar.

13. Side impact airbag assembly according to claim 12, wherein said first pillar is an A pillar and said second pillar is a B pillar, and wherein said side window is a front passenger cell side window.

14. Side impact airbag assembly according to claim 13, wherein a further of said pillars is a C pillar, a rear side window being disposed between the C pillar and the B pillar.

15. Side impact airbag assembly according to claim 14, wherein said window bag housing is disposed outside said pillars.

16. Side impact airbag assembly according to claim 15, wherein said window bag and window bag housing are configured such that said window bag covers at least a portion of the C pillar when in the inflated position.

17. Side impact airbag assembly according to claim 16, wherein said window bag includes a dividing portion which divides the pillar portion from the window portion.

18. Side impact airbag assembly according to claim 16, further comprising a window bag holding strap which pulls a lower part of the window bag toward a pillar when the window bag is in the inflated position.

19. Side impact airbag assembly according to claim 16, wherein a front window bag holding strap is provided which pulls a lower front part of the window bag toward an A pillar and a rear window bag holding strap is provided which pulls a lower rear part of the window bag toward a C pillar, when the window bag is in an inflated position.

20. Side impact airbag assembly according to claim 12, wherein said window bag housing is disposed outside said pillars.

21. Side impact airbag assembly according to claim 12, further comprising a window bag holding strap which pulls a lower part of the window bag toward a pillar when the window bag is in the inflated position.

* * * * *